Patented Aug. 31, 1954

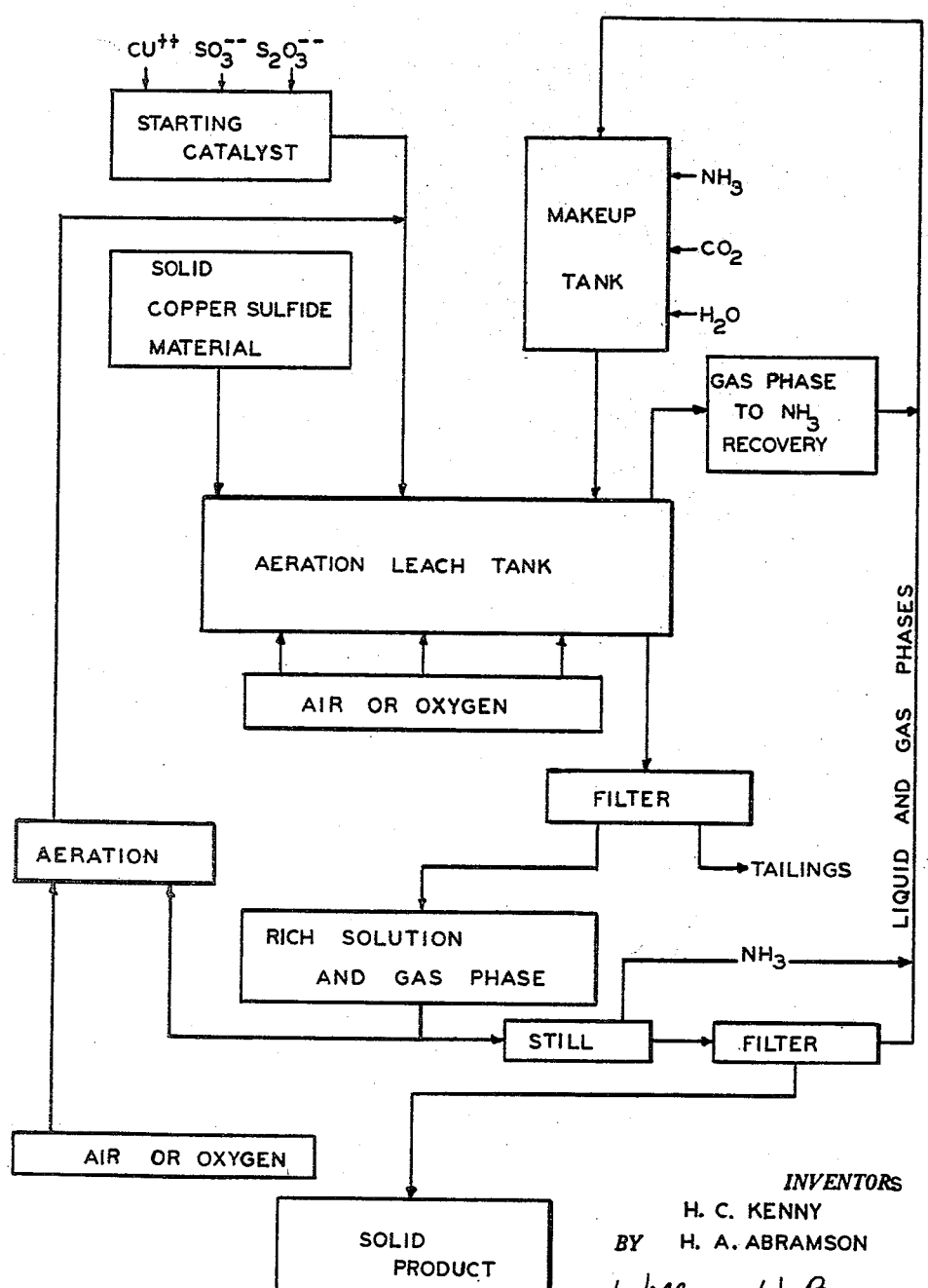

2,687,953

UNITED STATES PATENT OFFICE 2,687,953

AMMONIACAL LEACHING PROCESS

Herman C. Kenny, Lake Linden, and Helmer A. Abramson, Hancock, Mich., assignors to Calumet & Hecla, Inc., a corporation of Michigan Application May 31, 1952, Serial No. 290,996

4 Claims. (Cl. 75—103)

This invention relates to recovery of copper values from copper sulfide materials by leaching with an aqueous ammoniacal solution in the presence of oxygen, air or other oxygen-containing gas and one or more promoters or catalysts.

An object of the invention is to provide an improved process of leaching copper sulfide minerals without roasting in advance, especially to provide for a faster and more economical leaching.

A further object of the invention is to provide a continuous process of the type indicated which can be carried on for an extended period of time at maximum efficiency.

A further object is to provide such a continuous process wherein use is made of a catalyst or promoter which is generated in the course of the process itself and wherein concentrations of materials having a catalytic effect are regulated to avoid or reduce the concentration of a catalytic material antagonistic to the principal promoter or catalyst. More specifically, an object of the invention is to provide a continuous process for leaching sulfide copper with ammoniacal solvent in the presence of oxygen or air wherein self generated promoters or catalysts are utilized. Still more specifically, an object is to utilize in such a process as promoters or catalysts copper and sulfite and thiosulfate ions, maintaining the copper concentration within a suitable concentration range by recirculating rich solution but only after reducing its thiosulfate concentration.

With the foregoing and other objects in view, which will be in part obvious and in part pointed out hereinafter, the invention consists in the novel features herein described and claimed.

This application is a continuation-in-part of our two copending applications Serial Nos. 259,446 and 259,447 both of which were filed in the U. S. Patent Office on December 1, 1951, and the subject matter of both of which is hereby incorporated by reference in this application and made a part hereof.

As indicated in said applications, when copper sulfides or copper sulfide minerals as chalcocite, covellite, bornite and chalcopyrite are leached with aqueous, ammoniacal, ammonium carbonate solution, with aeration and agitation at normal or elevated temperature, these sulfide materials are dissolved relatively slowly in the absence of a catalyst and more rapidly with a catalyst or catalysts and at elevated temperatures. In fact, excellent leaching rates were attained with initially added copper ion, or sulfite ion, or thiosulfate ion. Mixtures of the latter two were found to be even more advantageous in some respects, and mixtures of copper with either of both the others were found to be good but not greatly superior to copper or sulfite ion or thiosulfate ion as sole catalyst.

In the drawings, the figure is a flow diagram showing a continuous process for ammoniacal leaching of copper sulfide materials, wherein self generated promoters are utilized and controlled to avoid the presence of harmful amounts.

The presence of thiosulfate ion, although helpful in small amounts when no copper is present, is of little value when copper is present and is positively harmful if allowed to build up to a high concentration. The continuous process, utilizing a portion of the rich solution as a promoter, can be controlled very simply as to copper content by the expedient of returning the optimum amount of rich solution to the process. When copper is present, sulfite ion is not helpful so that a treatment to reduce the concentration of thiosulfate ion of that portion of the rich solution which is fed back to the leach tank can be a treatment which also reduces the concentration of the sulfite ion. We have found that passing air or oxygen, in the absence of the solid copper sulfide material being leached through the portion of rich solution which is to be used as a catalyst or promoter, is a suitable treatment for the rich solution to reduce thiosulfite ion and allow the process to be made continuous.

The present preferred process includes continuous removal of a portion of a leach tank mixture, both liquid and solid phases, separation of the solid phase of said portion from the liquid phase thereof, aeration of part of the so separated liquid phase and returning of the so aerated part to the leach tank as a catalyst or promoter.

Oxidation of the rich solution out of contact with the ore or other sulfide being leached results in conversion of sulfite and thiosulfate to sulfate, partially or completely depending upon the degree of oxidation. The solid phase not being present, the $S_2O_3$ ion is not being produced and consequently the concentration thereof can be reduced by aeration with air or oxygen or other oxidation treatment, the copper in solution being necessary to act as a catalyst or promoter or oxygen carrier to effect the oxidation. If the copper were omitted, the oxidation of $S_2O_3$ would not take place.

The amount of oxidation of the rich leach solution prior to returning it to the reaction mixture is variable, depending upon the amount of solution to be returned, its copper concentration, the composition of the ore, the concentrations of the various other ingredients, the temperature, the pressure, etc., however, it is quite easy to determine for any particular reaction mixture, and set of conditions, how much aeration is desirable. It is quite satisfactory to aerate sufficiently to oxidize all the $S_2O_3$ ion but this is more aeration than is absolutely necessary. The benefits of the invention can be realized to a large extent if the concentration of $S_2O_3$ ion in the reaction mixture is kept down to 5 grams per liter and often to a considerable extent even at 15 grams per liter.

The following table shows operating ranges in concentrations of leach tank ingredients, in grams per liter, which may be used satisfactorily in the practice of the invention.

Table

| | |
|---|---|
| $NH_3$ | 40 to 200, preferably 60 to 120. |
| $CO_2$ | 15 to 100, preferably 20 to 50. |
| $Cu^1$ (dissolved) | 5 to 100, preferably 10 to 50. |
| Copper sulfide[2] (solid phase) | 2 to 100, preferably 10 to 50 (Cu content). |
| $SO_3$—ion and/or $S_2O_3$—ion | 0 to 15, preferably 0.3 to 5.0. |

$SO_4$—ion may be present; it is not useful but is not objectionable.

$O_2$ (air or oxygen) if passed through the mixture during reaction at a rate at least enough to suspend the ore, and, ordinarily, at least 2½ and preferably 3 or more atoms of oxygen per atom of Cu in the copper sulfide material treated. It will be understood that ammonia evolved will be recovered for re-use in the process.

[1] Solution of copper may be carried to saturation but the limits indicated are recommended.
[2] Extraction is improved if ores or concentrates are dried before being subjected to leaching.

Temperature of the reaction mixture is of great importance and should be kept within the limits from 35° C. to 70° C., preferably within the limits from 40° C. to 65° C. At low temperatures the reaction slows down, while at too high temperatures ammonia escapes and the rate of dissolution goes down. If pressure is employed, a higher temperature, e. g. 100° C., becomes practical; and when oxygen is used instead of air, a temperature of 75° C. is feasible even at atmospheric pressure. If the ammonia concentration is reduced, the temperature can be increased. The maximum temperature is reached when the partial pressure of $NH_3$ reaches the maximum permissible pressure. Pressures above one atmosphere, e. g., up to 60 atmospheres are quite satisfactory and, as indicated, the pressure selected determines the temperature which can be used. For a two-hour leach at atmospheric pressure, 20 grams per liter copper concentration and a temperature of 60° C., $NH_3$ concentration 120 g./l., $CO_2$ concentration 50 g./l. constitute about optimum conditions, yielding above 90% extraction in two hours from about 100 g./l. or chalcocite assaying 26% Cu.

Either air or oxygen may be used, and should be passed through the solution during the reaction at a rate to hold at least a part of the ore or compound in suspension and, preferably, at a rate to maintain all or nearly all the ore or compound being dissolved in suspension in the liquid phase. It is to be understood that the ore or other copper sulfide material is finely divided. It should be 100 mesh or finer, but some coarser material can be tolerated in the reaction mixture. It is desirable also to introduce the air or oxygen in the form of small-sized bubbles, e. g., through a porous block, a nozzle or a jet, as this speeds up the reaction.

Although ammonium carbonate solution is preferable, sulfate can be substituted for carbonate, mol for mol, and the invention can be practiced without either, although solution is less rapid if neither is used.

Referring to the drawing, the finely divided solid copper sulfide material may be cuprous or cupric sulfide, suitably chalcocite, covellite, chalcopyrite, or bornite. The amount of the solid phase in the leaching tank may be from 2 to 100, preferably 10 to 50 grams per liter. It may be supplied continuously or at frequent intervals, which is comprehended by the word continuous as used herein. The aeration tank wherein leaching takes place may be agitated by the aeration or by mechanical means or both. A portion of the content of the aeration tank is withdrawn continuously or at frequent intervals and passed to a filter or decanting or centrifugal separating means where the solid phase is separated out and discarded. The aeration tank may be elongated and may or may not be provided with a series of baffles whereby solids may progress from an inlet region of the tank to a remote outlet so that the solids to be discarded will be poor in copper. Liquid from that portion of such an aeration tank which is aerated but in which little or no solid copper compound is present may be returned to the inlet region (since it has been aerated out of contact with the copper sulfide material and thereby the thiosulfate ion concentration reduced) and serve as the catalyst. Some of the leach mixture, preferably from the outlet region will be continuously removed and the copper recovered from the liquid phase the solid phase being discarded. Ammonia values from the gas phase naturally will be recovered for re-use. In the makeup tank there will be added whatever is necessary to maintain the composition of the leach mixture as nearly uniform as feasible.

Having thus described the invention, what is claimed is:

1. A process for recovering copper values from copper sulfide material comprising the steps of contacting finely divided, solid, copper sulfide material with an oxygen-containing gas and an aqueous ammoniacal solution of the class consisting of aqueous ammoniacal ammonium carbonate solutions and aqueous ammoniacal ammonium sulfate solutions containing from 5 to 100 grams per liter of copper ion and less than 15 grams per liter of thiosulfate ion, in a body of reaction mixture, maintaining such copper ion and thiosulfate ion concentrations in said reaction mixture by continuously segregating a portion of the liquid phase of said reaction mixture, reducing the thiosulfate ion concentration thereof by oxidation thereof with oxygen-containing gas out of contact with said copper sulfide material and returning at least a part of said portion of the liquid phase to said reaction mixture, the portion of the liquid phase so segregated, oxidized and returned being of such quantity and thiosulfate ion concentration as to maintain the copper ion and thiosulfate ion in concentrations within said ranges; and continuously removing a portion of said reaction mixture and recovering copper values therefrom.

2. A process for recovering copper values from copper sulfide materials comprising the steps of contacting finely divided, solid, copper sulfide materials with an oxygen-containing gas and an aqueous ammoniacal ammonium carbonate solution containing from 5 to 100 grams per liter of copper ion and less than 5 grams per liter of thiosulfate ion, in a body of reaction mixture, maintaining such copper ion and thiosulfate ion concentrations in said reaction mixture and keeping the thiosulfate ion concentration thereof below 5 grams per liter by continuously segregating a portion of the liquid phase of said reaction mixture, reducing the thiosulfate ion concentration thereof by aeration with an oxygen-containing gas out of contact with said copper sulfide materials and returning at least a part of said portion of the liquid phase to said reaction mixture, the portion of the liquid phase so segregated, oxidized and returned being of such quantity and thiosulfate ion concentration as to maintain the copper ion and thiosulfate ion concentrations in said ranges; and continuously removing a portion of said reaction mixture and recovering copper values therefrom.

3. A process for recovering copper values from copper sulfide materials comprising the steps of contacting finely divided, solid, copper sulfide materials with an oxygen-containing gas and an aqueous ammoniacal ammonium carbonate solution containing from 5 to 100 grams per liter of copper ion and less than 5 grams per liter of thiosulfate ion, in a body of reaction mixture, maintaining such copper ion and thiosulfate ion concentrations in said reaction mixture by continuously segregating a portion of the liquid phase of said reaction mixture, reducing the thiosulfate ion concentration thereof by aeration with an oxygen-containing gas out of contact with said copper sulfide materials to substantially zero and returning at least a part of said portion of the liquid phase to said reaction mixture, the portion of the liquid phase so segregated, oxidized and returned being of such quantity and thiosulfate ion concentration as to maintain the copper ion and thiosulfate ion concentrations in said ranges; and continuously removing a portion of said reaction mixture and recovering copper values therefrom.

4. A process for recovering copper values from copper sulfide materials comprising the steps of contacting finely divided, solid, copper sulfide materials with an oxygen-containing gas and an aqueous ammoniacal solution containing from 5 to 100 grams per liter of copper ion, from 40 to 200 grams per liter of $NH_3$, from 15 to 100 grams per liter of $CO_2$ and less than 5 grams per liter of thiosulfate ion, in a body of reaction mixture, maintaining such copper ion and thiosulfate ion concentrations in said reaction mixture by continuously segregating a portion of the liquid phase of said reaction mixture, reducing the thiosulfate ion concentration thereof to substantially zero by aerating with an oxygen-containing gas out of contact with said copper sulfide materials and returning at least a part of said portion of the liquid phase to said reaction mixture, the portion of the liquid phase so segregated, oxidized and returned being of such quantity and thiosulfate ion concentration as to maintain the copper ion and sulfate ion concentrations in said ranges; and continuously removing a portion of said reaction mixture and recovering copper values therefrom.

References Cited in the file of this patent

UNITED STATES PATENTS

| Number | Name | Date |
|---|---|---|
| 702,047 | Collins | June 10, 1902 |
| 1,131,986 | Benedict | Mar. 16, 1915 |
| 1,451,734 | Irving | Apr. 17, 1923 |
| 1,516,356 | Taplin | Nov. 18, 1924 |
| 2,576,314 | Forward | Nov. 27, 1951 |
| 2,647,832 | Allen et al. | Aug. 4, 1953 |